US009061535B2

(12) United States Patent
Garbacz et al.

(10) Patent No.: US 9,061,535 B2
(45) Date of Patent: Jun. 23, 2015

(54) HIGH EFFICIENCY PRINTING SYSTEM FOR IMPROVED IMAGE QUALITY

(71) Applicant: Kodak Alaris Inc., Rochester, NY (US)

(72) Inventors: Gregory James Garbacz, Rochester, NY (US); Robert Fredric Mindler, Churchville, NY (US); Marcus M. Townsend, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/287,865

(22) Filed: May 27, 2014

(65) Prior Publication Data

US 2014/0354750 A1 Dec. 4, 2014

Related U.S. Application Data

(60) Provisional application No. 61/829,534, filed on May 31, 2013, provisional application No. 61/829,540, filed on May 31, 2013.

(51) Int. Cl.
*B41J 11/00* (2006.01)
*B41J 2/235* (2006.01)
*B41M 5/382* (2006.01)
*G01J 3/46* (2006.01)
*B41J 2/325* (2006.01)

(52) U.S. Cl.
CPC ....... *B41M 5/38292* (2013.01); *B41M 5/38235* (2013.01); *G01J 3/46* (2013.01); *B41J 11/0095* (2013.01); *B41J 2/325* (2013.01)

(58) Field of Classification Search
CPC .......... B41J 11/0095; B41J 2/325; G01J 3/46; B41M 5/38292
USPC .................. 347/172, 177, 188, 217
See application file for complete search history.

(56) References Cited

U.S. PATENT DOCUMENTS

| | | | | |
|---|---|---|---|---|
| 5,933,179 A * | 8/1999 | Fogle et al. | | 347/188 |
| 5,956,469 A * | 9/1999 | Liu et al. | | 358/1.9 |
| 5,978,005 A * | 11/1999 | Hadley | | 347/177 |
| 5,995,714 A * | 11/1999 | Hadley | | 347/177 |
| 6,023,284 A * | 2/2000 | Rogers et al. | | 347/217 |
| 2002/0001084 A1 * | 1/2002 | Yokozawa et al. | | 356/425 |

* cited by examiner

*Primary Examiner* — Sarah Al Hashimi
(74) *Attorney, Agent, or Firm* — Hogan Lovells US LLP

(57) ABSTRACT

A high efficiency thermal printing system, comprising: a donor ribbon having donor material; a receiver medium; a test pattern to be printed on the receiver medium using the donor ribbon; a print head, a sensor, and a processor is disclosed. The present invention is adapted to print the test pattern on the receiver medium by heating the donor ribbon to cause the donor material to transfer from the donor ribbon onto the receiver medium, thereby depleting donor material on the donor ribbon. Moreover, the sensor is adapted to measure a depletion amount of the donor material on the donor ribbon after printing the test pattern, and the processor is adapted to calibrate the thermal printing system by adjusting a lookup table in response to the measured depletion amount of donor material.

16 Claims, 8 Drawing Sheets

HIGH EFFICIENCY PRINTING SYSTEM FOR IMPROVED IMAGE QUALITY

CROSS-REFERENCE TO RELATED APPLICATIONS

This application claims the benefit of U.S. Provisional Application No. 61/829,534, filed May 31, 2013, and U.S. Provisional Application No. 61/829,540, filed May 31, 2013. Furthermore, this application hereby incorporates by reference both U.S. Provisional Application Nos. 61/829,534 and 61/829,540 in their entirety.

FIELD OF THE INVENTION

This invention pertains to the field of thermal printing systems and more particularly to a method and system for calibrating thermal printers that provides for improved image quality using high efficiency donor ribbons and receivers. The method and system can also be used to detect when non high efficiency donor ribbons and receivers are loaded into the thermal printer.

BACKGROUND OF THE INVENTION

In thermal dye sublimation printing, it is generally well known to render images by heating and pressing one or more donor materials such as a colorant (e.g., a dye) or other coating against a receiver medium having a colorant receiving layer. The heat is generally supplied by a thermal print head having an array of modulated heating elements. The donor materials are typically provided in sized donor patches on a movable web known as a donor ribbon. The donor patches are organized on the ribbon into donor sets; each set containing all of the donor patches that are to be used to record an image on the receiver web. For full color images, multiple color dye patches can be used, such as yellow, magenta, and cyan donor dye patches. Arrangements of other color patches can be used in like fashion within a donor set. Additionally, each donor set can include an overcoat or sealant layer.

Thermal printers offer a wide range of advantages in photographic printing including the provision of truly continuous tone scale variation and the ability to deposit, as a part of the printing process a protective overcoat layer to protect the images formed thereby from mechanical and environmental damage and fading. Accordingly, many photographic kiosks, portable printers, and home photo printers currently use thermal printing technology.

For low volume printing applications, such as portable or home thermal printing systems, these types of printers are adapted to print on individual sheets of receiver media. Thermal printing systems that are used for large volume applications, such as photographic kiosks, commonly utilize roll-fed receiver media.

Some current thermal printers utilize high efficiency donor ribbons and receivers, where small amounts of transferable dye remains on the transferable dye ribbon patch when printing high densities. High efficiency donors have enough dye to create satisfactory D-max densities on designated high efficiency receivers at a reduced level of thermal energy. These printers use a reduced amount of energy provided by the thermal print head to transfer the proper amount of dye to produce the correct maximum density color image. Printing methods and systems that utilize high efficiency donor ribbons and receivers use less energy and produce less heat, which reduces environmental impacts, energy consumption, and extends the operating life of the print head. Using standard thermal donor ribbons and receivers in a printing system designed to utilize high efficiency donor ribbons and receivers can cause premature wear and damage to the print head. These conditions can be caused by running the print head hotter than intended. Standard donor ribbons tend to be more abrasive than high efficiency donor ribbons causing premature wear. Using standard donor ribbons and receivers in printing systems designed to use high efficiency donor ribbons and receivers also causes reduction in image quality and requires re-calibration of the printer to compensate for this media type in order to produce an acceptable print.

In addition, requiring less energy to make high quality thermal prints not only reduces energy costs, it also enhances applications such as portability for on-site event imaging, stand alone and user operated retail kiosks, and home printing. These applications also make it difficult to calibrate the printer since a procedure must be performed by a knowledgeable user or trained operator that also requires a scanner, densitometer, or spectrophotometer to read a printed calibration target. The calibration target readings have to be entered back into the printer or a computer connected to the printer in order for the printer to be calibrated. Printer calibration is beneficial when replacing expended donor ribbons and receivers to compensate for manufacturing lot variations in media and or changes in ambient conditions, such as transporting the printer from and indoor to outdoor venue. However, typical calibration procedures waste time, materials, and require expensive ancillary equipment.

Some thermal printing systems incorporate optical emitters and sensors which are used to measure and analyze the color and density of thermal donor ribbon patches to determine that the correct donor ribbon patch color is in position in order to print the appropriate cyan, magenta, yellow color image layer and protective clear overcoat layer.

There remains a need in the art for a method to calibrate a high efficiency thermal printing system for printing color images which uses a thermal printer having high efficiency dye donor ribbon, having a repeating series of spaced patches of yellow, magenta and cyan colored heat transferable dyes and a protective clear overcoat layer, on to a high efficiency dye receiving sheet.

SUMMARY OF THE INVENTION

The present invention is directed to a system for calibrating a thermal printer by adjusting a look up table, comprising: a donor ribbon having donor material, a print head located in the thermal printer, wherein the print head is adapted to print images by transferring donor material from the donor ribbon onto a receiver medium, and a test pattern to be printed on the receiver medium. The system is further adapted to print the test pattern on the receiver medium by heating the print head to heat the donor ribbon causing the donor material to transfer from the donor ribbon onto the receiver medium, thereby depleting donor material on the donor ribbon. A further design of the system includes a sensor adapted to measure a depletion amount of the donor material on the donor ribbon after printing, and a processor adapted to adjust the lookup table based on the measured depletion amount of donor material, thereby calibrating the thermal printer. In another embodiment, the present invention is directed to a system for detecting incorrect media in a thermal printer comprising a sensor adapted to measure a depletion amount of donor material and a processor that is adapted to measure the depletion amount of donor material and to detect whether the depletion amount is different from the expected depletion amount by a particular threshold.

Advantages of the present invention include use of less energy and production of less heat, which reduces environmental impacts, energy consumption, and extends the operating life of the print head. Another advantage of the present invention is that it provides a calibration method for a high efficiency thermal printing system for printing color images which uses a thermal printer having high efficiency dye donor ribbon, having a repeating series of spaced patches of yellow, magenta and cyan colored heat transferable dyes and a protective clear overcoat layer, on to a high efficiency dye receiving sheet.

The outer wrap of a new roll of receiver or the top sheet of a cut sheet stack is typically discarded due to potential artifacts from finger prints and abrasions from handling and loading a roll or sheet stack into the printer. This section of receiver is adequate to be used to print the test target and as a result not be wasted. The existing optical emitters and sensors are used to determine that the appropriate color patch in the repeating sequence is in the proper position and have been adapted for to perform routine printer calibration. Embedded high efficiency printing logic and the existing sensors and emitters are used for identifying the different color patches of each series of spaced patches, to provide a method to measure a depletion amount of the donor material on the donor ribbon after printing the test pattern. A processor is used to adjust the lookup table based on the measured depletion amount of donor material, thereby calibrating the thermal printer.

It is to be understood that the attached drawings are for purposes of illustrating the concepts of the invention and may not be to scale.

DETAILED DESCRIPTION OF THE INVENTION

Figure 1:
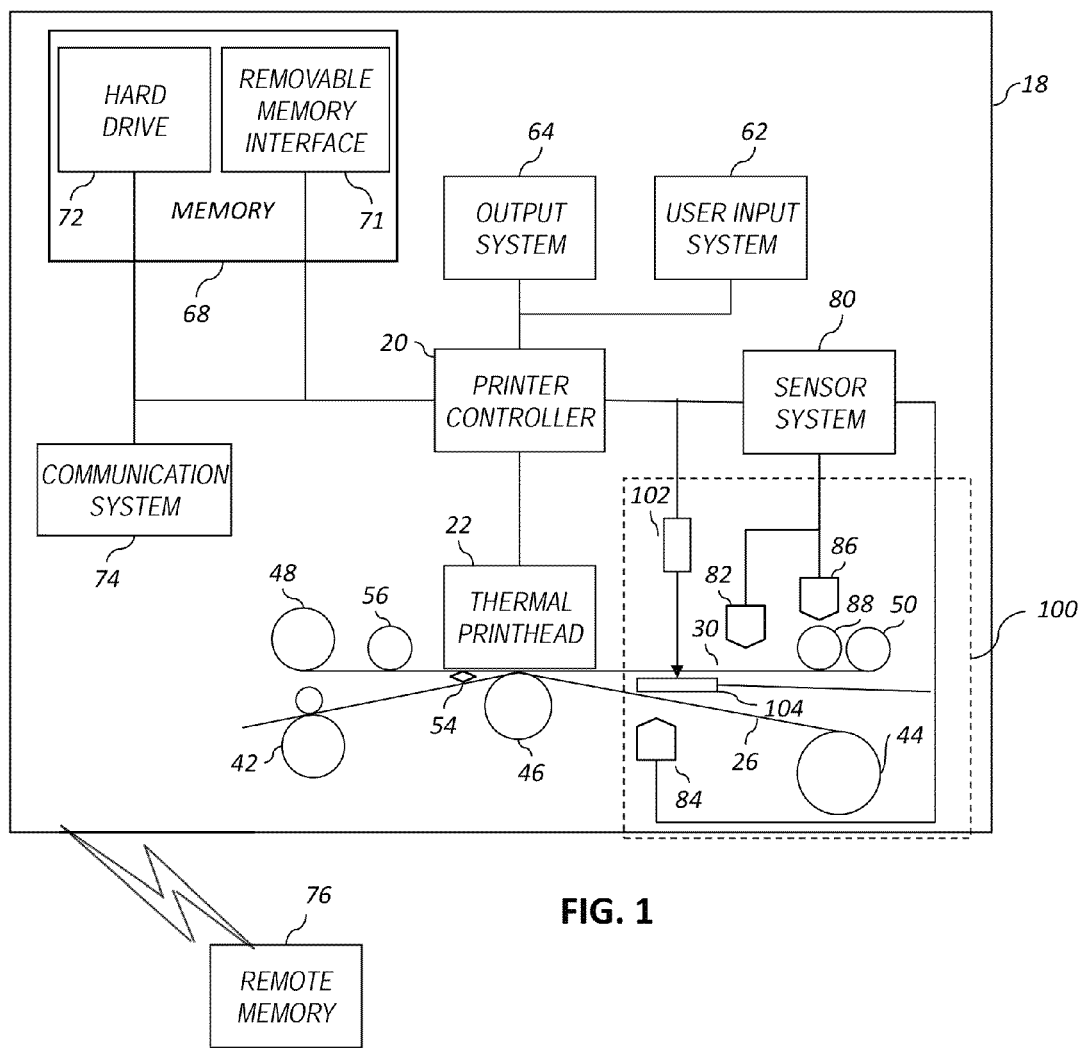
FIG. 1 shows a system diagram for an exemplary thermal printing system.

FIG. 1 shows a system diagram for an exemplary thermal printer 18 in accordance with the present invention. As shown in FIG. 1, thermal printer 18 has a printer controller 20 that causes a thermal print head 22 to record images onto receiver media 26 by applying heat and pressure to transfer material from a donor ribbon 30 to receiver media 26. The receiver media 26 includes a dye receiving layer coated on a substrate. As used herein, the term "receiver medium" and "receiver media" is used synonymously with the terms "thermal imaging receiver" and "thermal media." Similarly, the term "donor ribbon" is used synonymously with the terms "thermal donor" and "donor web."

Printer controller 20 can include, but is not limited to: a programmable digital computer, a programmable microprocessor, a programmable logic controller, a series of electronic circuits, a series of electronic circuits reduced to the form of an integrated circuit, or a series of discrete components. According to an aspect of the invention shown in FIG. 1, printer controller 20 also controls receiver supply pick rollers 41, a receiver drive roller 42, receiver exit rollers 43, a donor ribbon take-up roll 48, and a donor ribbon supply roll 50; which are each motorized for rotation on command of the printer controller 20 to effect movement of receiver medium 26 and donor ribbon 30.

Figure 2:
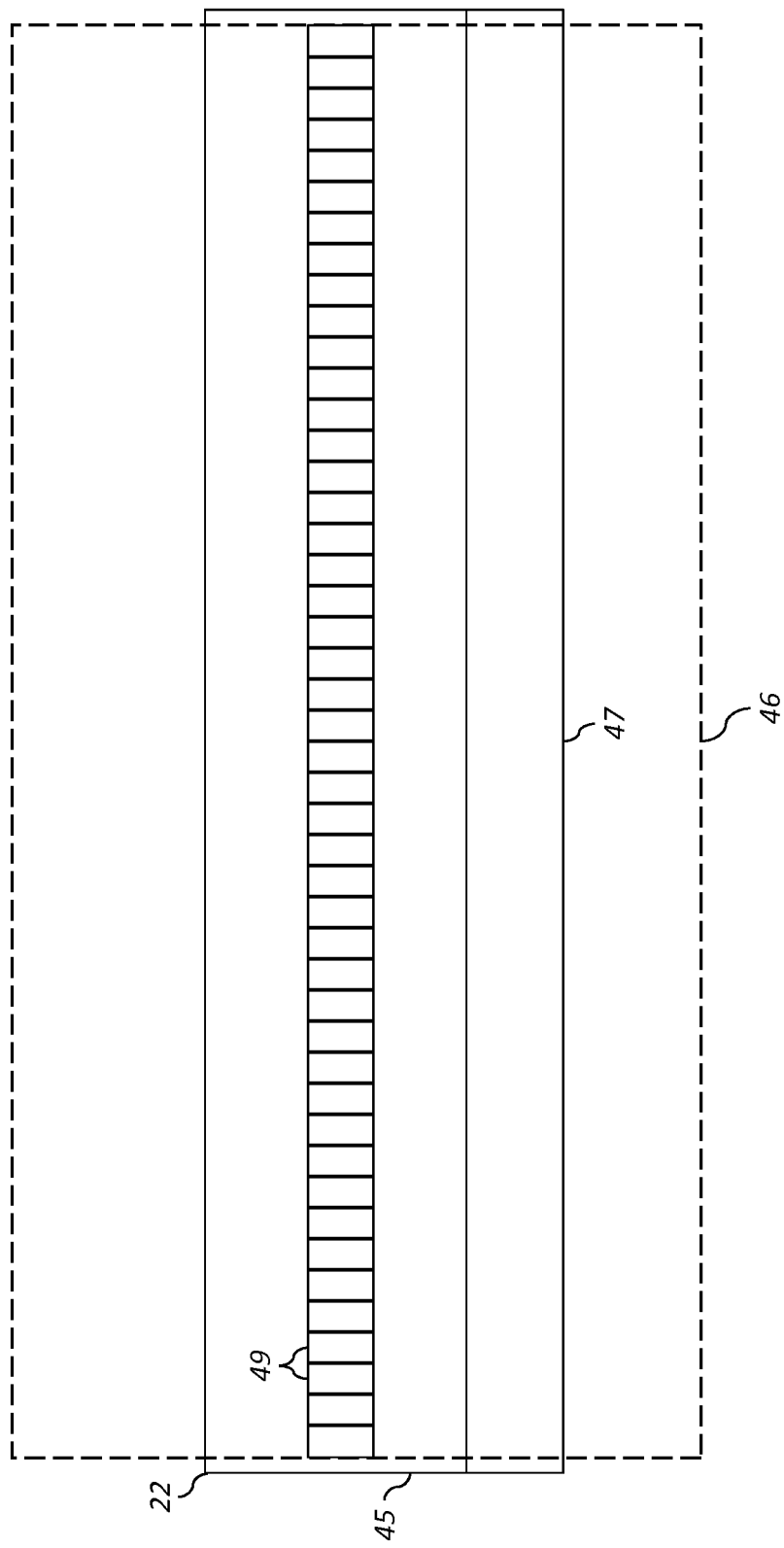
FIG. 2 is a diagram showing a bottom view of a thermal printhead.

FIG. 2 shows a bottom view according to one aspect of a typical thermal print head 22 with an array of thermal resistors 43 fabricated in a ceramic substrate 45. A heat sink 47, typically in the form of an aluminum backing plate, is fixed to a side of the ceramic substrate 45. Heat sink 47 rapidly dissipates heat generated by the thermal resistors 43 during printing. As shown in FIG. 2, the thermal resistors 43 are arranged in a linear array extending across the width of platen roller 46 (shown in phantom). Such a linear arrangement of thermal resistors 43 is commonly known as a heat line or print line. However, other non-linear arrangements of thermal resistors 43 can be used in various aspects of the present invention. Further, it will be appreciated that there are a wide variety of other arrangements of thermal resistors 43 and thermal print heads 22 that can be used in conjunction with the present invention.

The thermal resistors 43 are adapted to generate heat in proportion to an amount of electrical energy that passes through thermal resistors 43. During printing, printer controller 20 transmits signals to a circuit board (not shown) to which thermal resistors 43 are connected, causing different amounts of electrical energy to be applied to thermal resistors 43 so as to selectively heat donor ribbon 30 in a manner that is intended to cause donor material to be applied to receiver medium 26 in a desired manner.

Figure 3A:
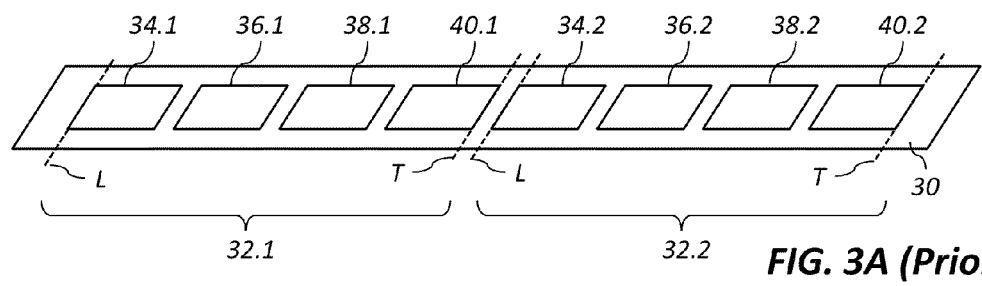
FIG. 3A is a diagram illustrating a donor ribbon having four different donor patches.
Figure 3B:
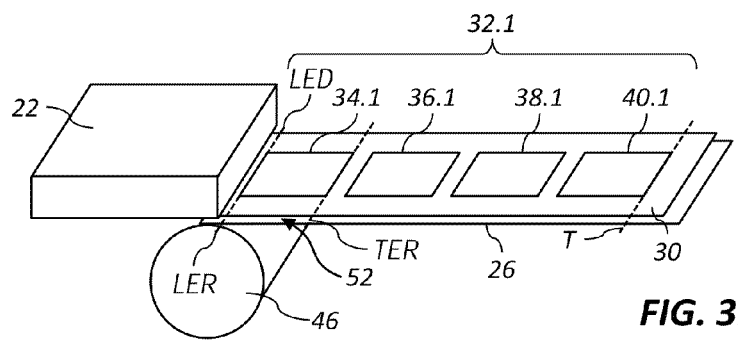
FIGS. 3B-3C illustrate a printing operation.

As is shown in FIG. 3A, donor ribbon 30 comprises a first donor patch set 32.1 having a yellow donor patch 34.1, a magenta donor patch 36.1, a cyan donor patch 38.1 and a clear donor patch 40.1; and a second donor patch set 32.2 having a yellow donor patch 34.2, a magenta donor patch 36.2, a cyan donor patch 38.2 and a clear donor patch 40.2. Each donor patch set 32.1 and 32.2 has a patch set leading edge L and a patch set trailing edge T. In order to provide a full color image with a clear protective coating, the four patches of a donor patch set; are printed, in registration with each other, onto a common image receiving area 52 of receiver medium 26 shown in FIG. 3B. The printer controller 20 (FIG. 1) provides variable electrical signals in accordance with input image data to the thermal resistors 43 (FIG. 2) in the thermal print head 22 in order to print an image onto the receiver media 26. Each color is successively printed as the receiver medium 26 and the donor ribbon move from right to left as seen by the viewer in FIG. 3B.

During printing, the printer controller 20 raises thermal print head 22 and actuates donor ribbon supply roll 50 (FIG. 1) and donor ribbon take-up roll 48 (FIG. 1) to advance a leading edge L of the first donor patch set 32.1 to the thermal print head 22. In the embodiment illustrated in FIGS. 3A-3C, leading edge L for first donor patch set 32.1 is the leading edge of yellow donor patch 34.1. As will be discussed in greater detail below, the position of this leading edge L can be determined by using a position sensor to detect an appropriate marking indicia on donor ribbon 30 that has a known position relative to the leading edge of yellow donor patch 34.1 or by directly detecting the leading edge of yellow donor patch 34.1.

Printer controller 20 also actuates receiver pick rollers 41 (FIG. 1) to pick cut sheet receiver from receiver supply cassette 44 (FIG. 1) into drive roller 42 (FIG. 1). Printer controller 20 also actuates drive roller 42 (FIG. 1), so that image receiving area 52 of receiver medium 26 is positioned with respect to the thermal print head 22. In the embodiment illustrated, image receiving area 52 is defined by a receiving area leading edge LER and a receiving area trailing edge TER on receiver media 26. Donor ribbon 30 and receiver media 26 are positioned so that donor patch leading edge LED of yellow donor patch 34.1 is registered at thermal print head 22 with receiving area leading edge LER of image receiving area 52. Printer controller 20 then causes a motor or other conventional structure (not shown) to lower thermal print head 22 so that a lower surface of donor ribbon 30 engages receiver medium 26 which is supported by platen roller 46. This creates a pressure holding donor ribbon 30 against receiver media 26.

Printer controller 20 then actuates receiver drive roller 42 (FIG. 1), donor ribbon take-up roll 48 (FIG. 1), and donor ribbon supply roll 50 (FIG. 1) to move receiver medium 26 and donor ribbon 30 together past the thermal print head 22. Concurrently, printer controller 20 selectively operates thermal resistors 43 (FIG. 2) in thermal print head 22 to transfer donor material from yellow donor patch 34.1 to receiver media 26.

Figure 3C:
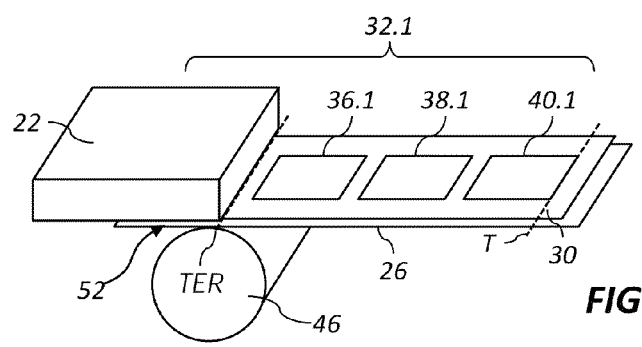

As donor ribbon 30 and receiver medium 26 leave the thermal print head 22, a peel member 54 (FIG. 1) separates donor ribbon 30 from receiver medium 26. Donor ribbon 30 continues over idler roller 56 (FIG. 1) toward the donor ribbon take-up roll 48. As shown in FIG. 3C, printing continues until the receiving area trailing edge TER of image receiving area 52 of receiver medium 26 reaches the printing zone between the thermal print head 22 and the platen roller 46. The printer controller 20 then adjusts the position of donor ribbon 30 and receiver medium 26 using a predefined pattern of movements so that a leading edge of each of the next donor patches (i.e., magenta donor patch 36.1) in the first donor patch set 32.1 are brought into alignment with receiving area leading edge LER of image receiving area 52 and the printing process is repeated to transfer further material to the image receiving area 52. This process is repeated for each donor patch thereby forming the complete image.

Returning to a discussion of FIG. 1, the printer controller 20 operates the thermal printer 18 based upon input signals from a user input system 62, an output system 64, a memory 68, a communication system 74, and sensor system 80. The user input system 62 can comprise any form of transducer or other device capable of receiving an input from a user and converting this input into a form that can be used by printer controller 20. For example, user input system 62 can comprise a touch screen input, a touch pad input, a 4-way switch, a 6-way switch, an 8-way switch, a stylus system, a trackball system, a joystick system, a voice recognition system, a gesture recognition system or other such user input systems. An output system 64, such as a display or a speaker, is optionally provided and can be used by printer controller 20 to provide human perceptible signals (e.g., visual or audio signals) for feedback, informational or other purposes.

Data including, but not limited to, control programs, digital images and metadata can also be stored in memory 68. Memory 68 can take many forms and can include without limitation conventional memory devices including solid state, magnetic, optical or other data storage devices. In FIG. 1, memory 68 is shown having a removable memory interface 71 for communicating with removable memory (not shown) such as a magnetic, optical or magnetic disks. The memory 68 is also shown having a hard drive 72 that is fixed with thermal printer 18 and a remote memory 76 that is external to printer controller 20 such as a personal computer, computer network or other imaging system.

As shown in FIG. 1, printer controller 20 interfaces with a communication system 74 for communicating external devices such as remote memory 76. The communication system 74 can include for example, a wired or wireless network interface that can be used to receive digital image data and other information and instructions from a host computer or network (not shown).

A sensor system 80 includes circuits and systems that are adapted to detect conditions within thermal printer 18 and, optionally, in the environment surrounding thermal printer 18, and to convert this information into a form that can be used by the printer controller 20 in governing printing operations. Sensor system 80 can take a wide variety of forms depending on the type of media therein and the operating environment in which thermal printer 18 is to be used.

As shown in FIG. 1, sensor system 80 includes an optional donor position sensor 82 that is adapted to detect the position of donor ribbon 30, and a receiver position sensor 84 that is adapted to detect a position of the receiver medium 26. The printer controller 20 cooperates with donor position sensor 82 to monitor the donor ribbon 30 during movement thereof so that the printer controller 20 can detect one or more conditions on donor ribbon 30 that indicate a leading edge of a donor patch set. In this regard, the donor ribbon 30 can be provided with markings or other optically, magnetically or electronically sensible indicia between each donor patch set (e.g., donor patch set 32.1) or between donor patches (e.g., donor patches 34.1, 36.1, 38.1, and 40.1). Where such markings or indicia are provided, donor position sensor 82 is provided to sense these markings or indicia, and to provide signals to controller 20. The printer controller 20 can use these markings and indicia to determine when the donor ribbon 30 is positioned with the leading edge of the donor patch set at thermal print head 22. In a similar way, printer controller 20 can use signals from receiver position sensor 84 to monitor the position of the receiver medium 26 to align receiver medium 26 during printing. Receiver position sensor 84 can be adapted to sense markings or other optically, magnetically or electronically sensible indicia between each image receiving area of receiver media 26.

During a full image printing operation, the printer controller 20 causes donor ribbon 30 to be advanced in a predetermined pattern of distances so as to cause a leading edge of each of the donor patches (e.g., donor patches 34.1, 36.1, 38.1, and 40.1) to be properly positioned relative to the image receiving area 52 at the start each printing process. The printer controller 20 can optionally be adapted to achieve such positioning by precise control of the movement of donor ribbon 30 using a stepper type motor for motorizing donor ribbon take-up roll 48 or donor ribbon supply roll 50 or by using a movement sensor 86 that can detect movement of donor ribbon 30. In one example, a follower wheel 88 is provided that engages donor ribbon 30 and moves therewith. Follower wheel 88 can have surface features that are optically, magnetically or electronically sensed by the movement sensor 86. According to one aspect of the present invention, the follower wheel 88 that has markings thereon indicative of an extent of movement of donor ribbon 30 and the movement sensor 86 includes a light sensor that can sense light reflected by the markings. According to other aspects of the present invention, perforations, cutouts or other routine and detectable indicia can be incorporated onto donor ribbon 30 in a manner that enables the movement sensor 86 to provide an indication of the extent of movement of the donor ribbon 30.

As is also illustrated in FIG. 1, printer 18 includes a color sensing system having a light source or emitter 102 and a detector 104. In one embodiment, the emitter 102 is adapted to emit light of a particular color to a portion of donor ribbon 30. The emitted light can be white light, neutral light, or any of colored light such as red, green, or blue. In this embodiment, detector 104 can comprise an opto-electronic circuit having a sensing surface (not shown) that can sense a non-absorbed portion of the light applied to donor ribbon 30 by emitter 102 and that can generate a signal that is indicative of the color and intensity of the non-absorbed light. Examples of such a color sensing type of detector 104 include, but are not limited to, a densitometer, a color imager, a colorimeter or like device.

According to another aspect of the present invention, emitter 102 can comprise a multi-color light source that can automatically, or in response to signals from printer controller 20, apply a pattern of differently colored light to a portion of donor ribbon 30. Detector 104 can be of a type that does not necessarily measure the color of the non-absorbed portion of the light, but rather measures the intensity of the non-absorbed portion of the light using a plurality of light sensors, each adapted to determine an intensity of light within a specific range of frequencies and that provide signals indicative thereof to printer controller 20 so that printer controller 20 can combine the signals to determine the color of the portion of donor ribbon 30 being sensed thereby.

The color sensing system can sense light that is reflected by receiver medium 26 or it can sense light that is transmitted through donor ribbon 30. FIG. 1 illustrates a transmitted light type of sensing wherein the emitter 102 is positioned to direct a light onto donor ribbon 30 and color light detector 104 is positioned to receive at least a portion of the light that is transmitted by the illuminated portion of donor ribbon 30. The color sensing system operates in cooperation with printer controller 20 and provides signals to printer controller 20 from which printer controller 20 can determine the colors sensed by color sensing system. Color sensing system can operate continuously, or can operate selectively, such as in response to signals from printer controller 20.

Figure 4:
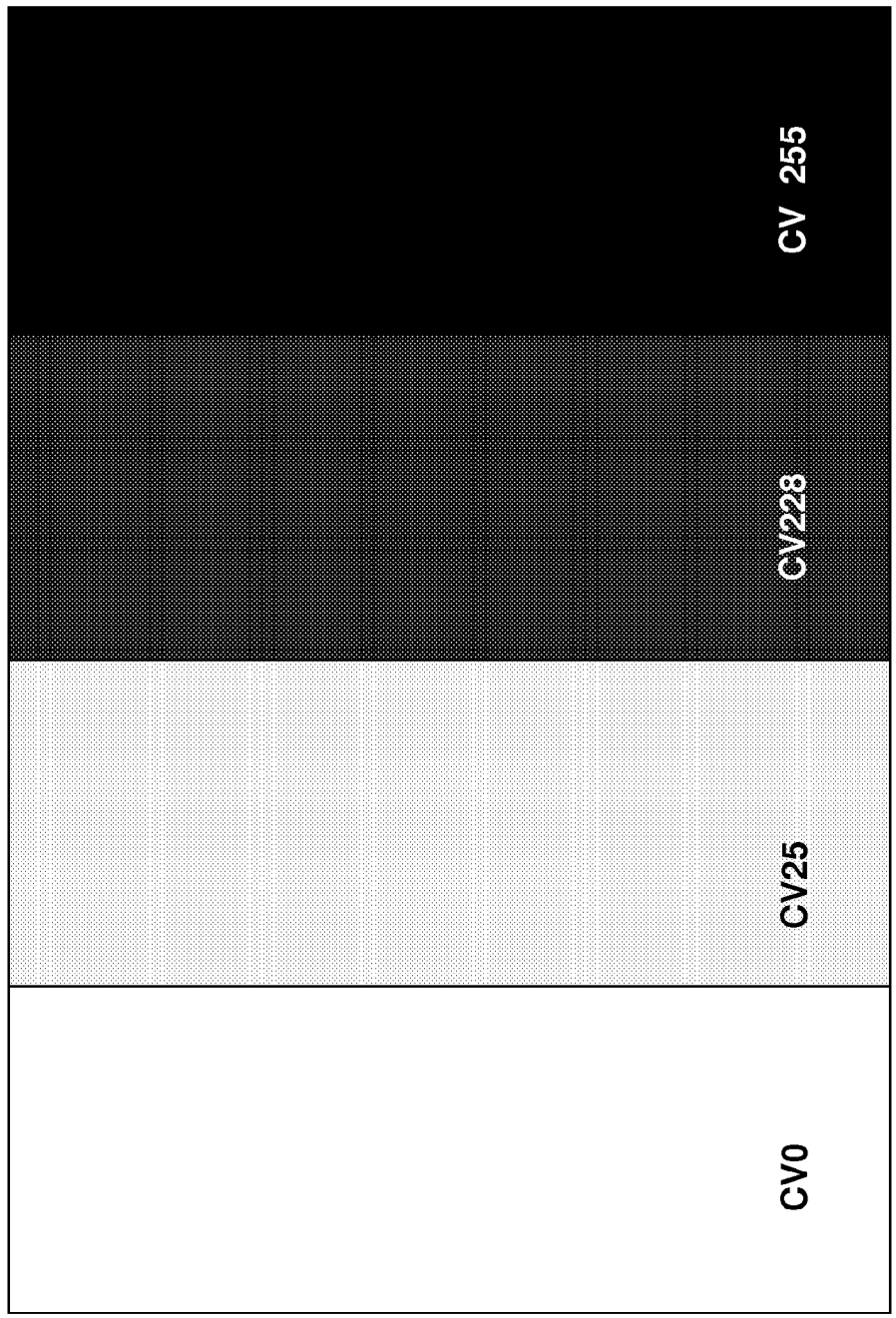
FIG. 4 shows an example of a test pattern to be printed on the receiver medium.

FIG. 4 shows an example of a test pattern to be printed on the receiver medium 26. The test pattern can include image portions at various different print densities to thermally transfer varying amounts of dye from the donor ribbon 30 to the receiver medium 26. In color printing, each color channel, Red, Green and Blue contains 8-bits of color, or 24-bits total; Red 8-bits+Green 8-bits+Blue 8-bits. Each color channel contains 256 shades of color. Each color image can contain 256 (R)×256 (B)×256 (G), or more than 16 million different colors.

Commonly, these 256 shades for each color channel are associated with a Code Value (CV) that may be defined using hexadecimal notation (HEX) for the combination of Red, Green and Blue color values (RGB). The lowest value that can be given is 0 (in HEX:00). The highest value that can be given is 255 (in HEX:FF). The process to generate the correct code values is directly related to the amount of energy applied from the thermal print head 22 to transfer the yellow, magenta and cyan dyes to the receiver medium 26. Code Value 0 results in the application of the amount of energy from the thermal print head 22 necessary to cause 0% dye transfer (while still maintaining print head temperature at a minimum desired level) for each color. Code Value 255 results in the application of the amount of energy from the thermal print head 22 to cause slightly less than 100% dye transfer for each color. There is a small amount of energy held back for a margin of safety.

For common color printing, pre-determined energy values are applied from the thermal print head 22 for each RGB code value on each color patch, yellow, magenta and cyan to create the correct image quality. For a highly efficient printing system, transfer of yellow, magenta or cyan dye from the donor ribbon 30 to the receiver medium 26 should occur with the lowest amount of energy possible. To verify that the pre-defined high efficient energy levels that are built into the printer's firmware match the high efficiency of the transferable donor ribbon 30 and receiver medium 26, the transmitted or reflected light is measured pre- and post-depletion of the donor ribbon. In some aspects of the present invention, a first measurement can be made before the test pattern is printed on the received medium 26 by measuring the amount of light that passes through, or is reflected by, a donor patch. A similar measurement is made after the test pattern 28 has been printed on the receiver medium 26. The target depletion of the dye on the donor ribbon 30 is between 0% and 100% based on the test pattern 28.

When the printer's pre-defined maximum dye transfer energy (CV255=Dmax) is applied, equal to or slightly less than 100% of the dye in that portion of donor patch in a high efficiency donor ribbon 30 is depleted. When the printer's pre-defined near maximum dye transfer energy (CV228=D<max) has been applied, equal to or less than 90% of the dye in that portion of donor patch has been depleted. When the printer's pre-defined mid level dye transfer energy (CV127=Dmid) has been applied, equal to or near 50% of the dye in that portion of donor patch has been depleted. When the printer's pre-defined near minimum dye transfer energy (CV25=D>min) has been applied, equal to or less than 10% of the dye in that portion of donor patch has been depleted. When the printer's pre-defined minimum dye transfer energy (CV0=Dmin) has been applied, equal to or near 0% of the dye in that portion of donor patch has been depleted.

If the printer's pre-defined near maximum dye transfer energy (CV228=D<max) has been applied, and near 100% of the dye in that portion of donor patch has been depleted, the high efficiency printing system is not working properly. This means that the print output between CV228 up to CV255 does not show any difference. Similarly, if the printer's pre-defined near minimum dye transfer energy (CV25=D>min) has been applied, and 0% of the dye in that portion of donor patch has been depleted, the high efficiency printing system is not working properly. This means that the print output between CV0 and CV25 does not show any difference. The amount of energy required to affect dye transfer corresponding to particular code values can be stored in processor accessible memory as a lookup table.

It should be noted that, in other aspects of the present invention, Dmax can be represented using CV0 and Dmin can be represented using CV255. The choice of code values used to represent the amount of energy needed to transfer a particular amount of dye from donor ribbon 30 onto receiver medium 26 can vary from system to system.

Incorporated herein by reference, U.S. Pat. No. 8,035,671B2 Dual-use sensor assembly for a thermal printer, filed Nov. 24, 2008 in the name of Stuart Gerard Evans discloses using an embedded reflection densitometer for the purposes of neutral or color calibration in addition to identifying the proper donor patch. The reflection densitometer or its equivalent is used to take reflection density measurements from the surface of the printed media. In addition, the specifications for the embedded densitometer are more stringent than for the donor patch sensor assembly and requires a tone scale test target having a plurality of discrete patches ranging from low density to high density.

Incorporated herein by reference, U.S. Pat. No. 7,324,124 B2 Printer and method for detecting donor material, filed Nov. 18, 2005 in the names of Walter H. Isaac, et al. discloses a method for operating a printer that applies donor material from donor patches on a donor ribbon to a receiver medium, the donor patches being organized into sets each set including at least one colored donor material patch and a protective material donor patch, the method comprising the steps of: applying a non-visible light to a location on the donor ribbon; sensing a portion of non-visible light that is not absorbed by the donor ribbon; and determining whether the portion of the donor patch to which the non-visible light has been applied has unused protective donor material thereon, said determining being based upon the sensed non-visible light.

Incorporated herein by reference, U.S. Pat. No. 7,666,815B2 Thermal donor for high-speed printing discloses a dye-donor element, a method of printing using the dye-donor element, and a print assembly including the dye-donor element, wherein the dye-donor layer of the dye-donor element includes ethyl cellulose as a binder. The dye-donor element is capable of printing a defect-free image on a receiver element at a line speed of 2.0 msec/line or less while maintaining a print density of at least 2.0.

At high printing speeds, considered to be 2.0 msec/line or less, the print head 22 undergoes heat on/off cycles very rapidly. This generated heat must be driven through the dye-donor support assemblage very rapidly to effect the dye transfer from the donor ribbon 30 to the receiver medium 26. Each layer in the donor ribbon 30 can act as an insulator, slowing down the heat transfer through the layers of the donor ribbon 30 to the receiver medium 26. Because of the short heat application time, any reduction in heat transfer efficiency results in a lower effective temperature in the donor layer during printing, which can result in a lower transferred dye density. It is known to overcome the low print density associated with shorter line times by increasing the printhead voltage, increasing the dye density in the dye-donor layer, or a combination thereof. Applying higher print head voltages can decrease the lifetime of the thermal print head 22, requires a higher power supply, and can require additional cooling delays, all of which increase cost. Increasing the dye density in the dye-donor layer also increases costs, as well as increasing the chance of unwanted dye transfer, such as during storage of a dye-donor element.

Another problem exists with many of the donor ribbons 30 and receiver media 26 used in thermal dye transfer systems. At the high temperatures used for thermal dye transfer, many polymers used in these elements can soften and adhere to each other, resulting in sticking and tearing of the donor ribbon 30 and receiver media 26 upon separation from one another after printing. Areas of the dye-donor layer other than the transferred dye can adhere to the receiver medium 26, causing print defects ranging from microscopic spots to sticking of the entire dye-donor layer on the receiver medium 26. This is aggravated when higher printing voltages, resulting in higher temperatures, are used in high speed printing. Another problem with high speed printing is that the more rapid physical motion of the donor/receiver assembly results in higher peel rates between the donor ribbon 30 and the receiver medium 26 as they are separated after printing, which can aggravate sticking of the donor ribbon 30 and receiver medium 26.

Figure 5A:
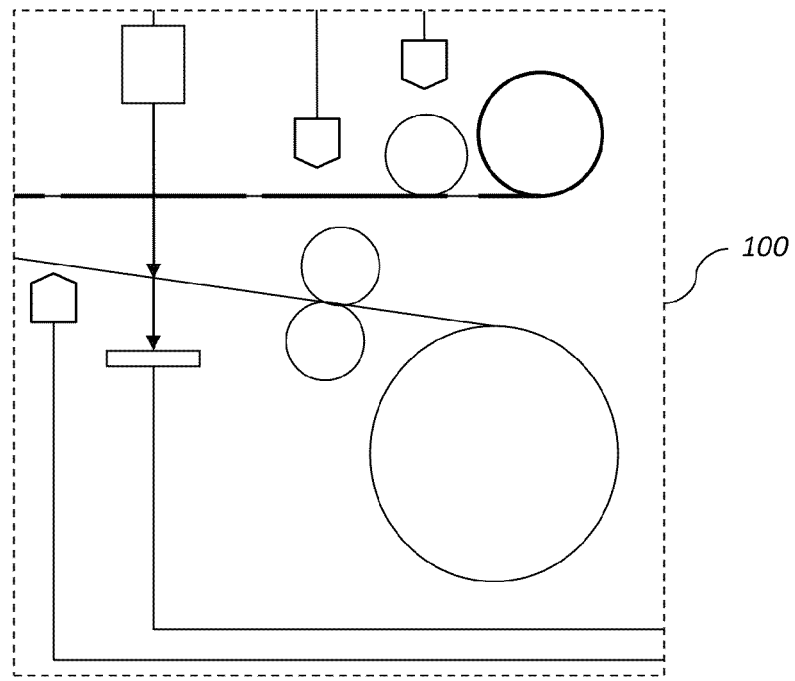
FIG. 5A shows an embodiment of the configuration of an emitter and detector pair according to an aspect of the present invention.

FIG. 5A shows a configuration of an emitter and detector pair according to an aspect of the present invention. In the configuration shown in FIG. 5A, the emitter 102 is positioned above the donor ribbon 30 and the receiver medium 26. The detector 104 is placed below the donor ribbon 30 and the receiver medium 26. The signal emitted by the emitter 102 passes through both the donor ribbon 30 and the receiver medium 26 before being detected at the detector 104.

Figure 5B:
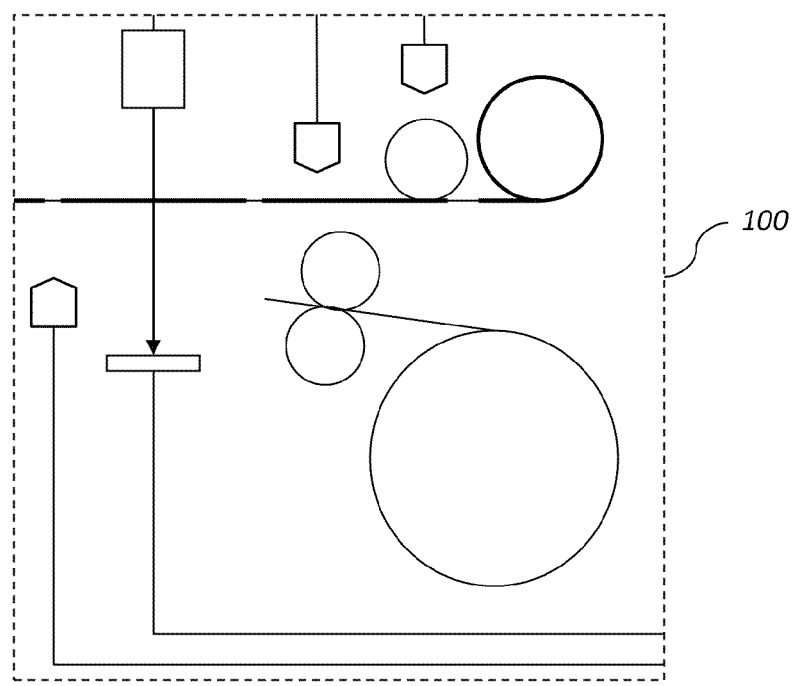
FIG. 5B shows another embodiment of the configuration of an emitter and detector pair according to an aspect of the present invention.

FIG. 5B shows a configuration of an emitter and detector pair according to another aspect of the present invention. In the configuration shown in FIG. 5B, the emitter 102 is positioned above the donor ribbon 30. The receiver medium 26 is moved out of the emitter detector path. The detector 104 is placed below the donor ribbon 30. The signal emitted by the emitter 102 passes through the donor ribbon 30 before being detected at the detector 104.

Figure 6A:
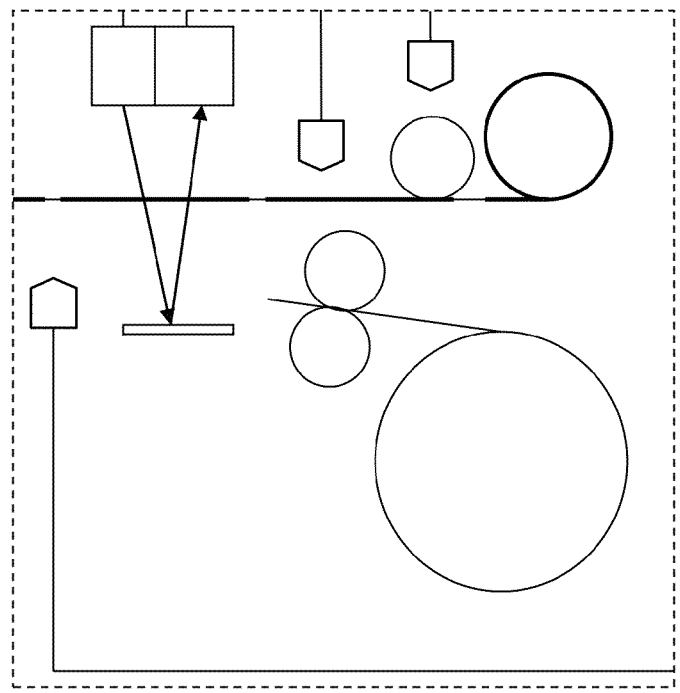
FIG. 6A shows another embodiment of the configuration of an emitter and detector pair according to an aspect of the present invention.

FIG. 6A shows a configuration of an emitter and detector pair according to another aspect of the present invention. In the configuration shown in FIG. 5B, both the emitter 102 and the detector 104 are positioned above the donor ribbon 30. The receiver medium 26 is moved out of the signal path. A reflective surface 106 is placed below the donor ribbon 30. The signal emitted by the emitter 102 passes through the donor ribbon 30, is reflected by the reflective surface 106, before being detected at the detector 104.

Figure 6B:
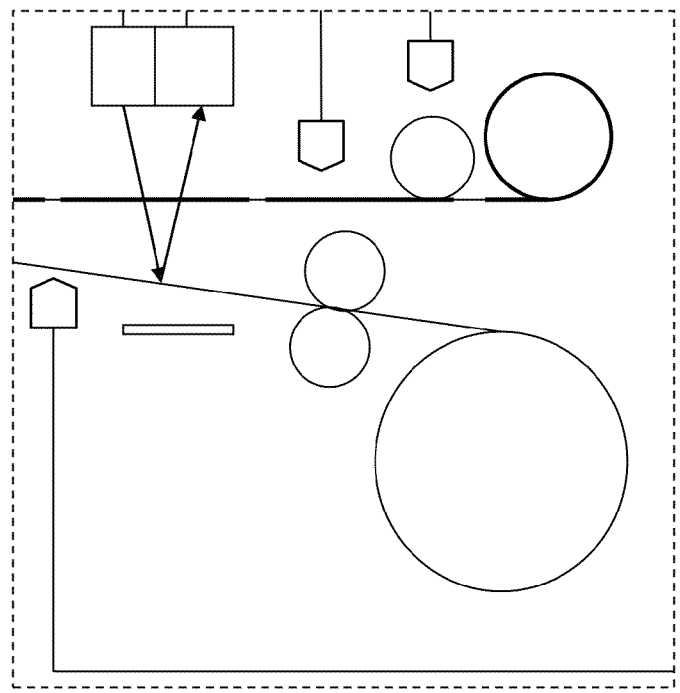
FIG. 6B shows another embodiment of the configuration of an emitter and detector pair according to an aspect of the present invention.

FIG. 6B shows a configuration of an emitter and detector pair according to another aspect of the present invention. In the configuration shown in FIG. 5B, both the emitter 102 and the detector 104 are positioned above the donor ribbon 30 and the receiver medium 26. A reflective surface 106 is placed below the donor ribbon 30 and the receiver medium 26. The signal emitted by the emitter 102 passes through the donor ribbon 30 and the receiver medium 26, can be reflected by the receiver medium 26 or the reflective surface 106, before being detected at the detector 104.

Different configurations of the emitter detector pair and the location of the donor ribbon 30 and the receiver medium 26 allow for different operations to be performed on the printer. If both the donor ribbon 30 and the receiver medium 26 are present in the emitter detector path, the donor patch color can be read before printing the test pattern and the donor depletion level can be measured after printing the test pattern to calibrate the printer. The measured donor depletion level indicates proper donor ribbon 30 and receiver medium 26 are loaded. The receiver medium 26 can be determined by moving the donor ribbon 26 to a clear laminate patch and measuring the signal either transmitted through or reflected by the unprinted receiver medium 26 to determine receiver type. The receiver medium 26 can be moved out of emitter detector path to measure the donor patch color on the donor ribbon in the emitter detector path. The receiver medium 26 can then be moved back into the emitter detector path and a test pattern can be printed using the donor patch. The receiver medium 26 can be moved out of the emitter detector path to measure the donor depletion level to calibrate the printer.

In another aspect of the present invention, wherein the emitter 102 and detector 104 are both located above the donor ribbon 30, the receiver medium 26 can act as a reflector to reflect the signal off of the unprinted receiver medium 26. In another aspect of the present invention, a reflective surface 106, can be used to reflect the signal from the emitter 102 to the detector 104.

The color sensing system can also extend across a full printable width of receiver medium 26 so that the color of any portion of image can be sensed without translating color sensing system 60 relative to receiver medium 26.

Emitters 102 and detectors 104 can be selected to operate in the visible or invisible range of the electromagnetic spectrum. These components can be constructed as a single emitter and detector pair with a broad frequency range or individual unit pairs to cover portions of the frequency range. The chosen component configuration and frequency response is sufficient to measure the color and density range of both unused and depleted donor patch for each color of the donor patches, including black and metallic colored patches such as gold and silver. The frequency response range of the emitter and detector pair can also be selected to measure the reflective and or transmissive colors and densities of unused and printed receiver media included various surface textures. The emitter and detector pair can also be configured to operate in a transmissive or reflective mode. Receiver medium 26 can be moved into and out of the optical path between emitter 102 and the detector 104 by winding it back onto the roll for roll fed thermal printers. For sheet fed thermal printers, the individual sheet would not be fed into the optical path between the emitter 102 and the detector 104 until required. The emitter and detector pair also identifies which donor patch in the repeating sequence of donor patches is in position and can selectively place the clear laminate patch in the optical patch to read though the clear laminate patch in order to measure the color, density, or surface type of the receiver media, either by reflective or transmissive configurations. Operationally the emitter and detector pair measure the donor patch depletion either directly from the donor patch or the amount of donor deposited on the receiver media.

In configurations where the emitter and detector pair are side by side and operate in a mode that requires the light from the emitter to be reflected back to the detector, the light from the emitter passes through the selected donor patch and reflects off of either the surface of unused or printed receiver media or off of a reflective surface below the receiver media path, when the receiver media is out of the emitter detector optical path. The reflective surface is an optical component such as a front surface mirror or polished metallic or glass surface.

Figure 7:
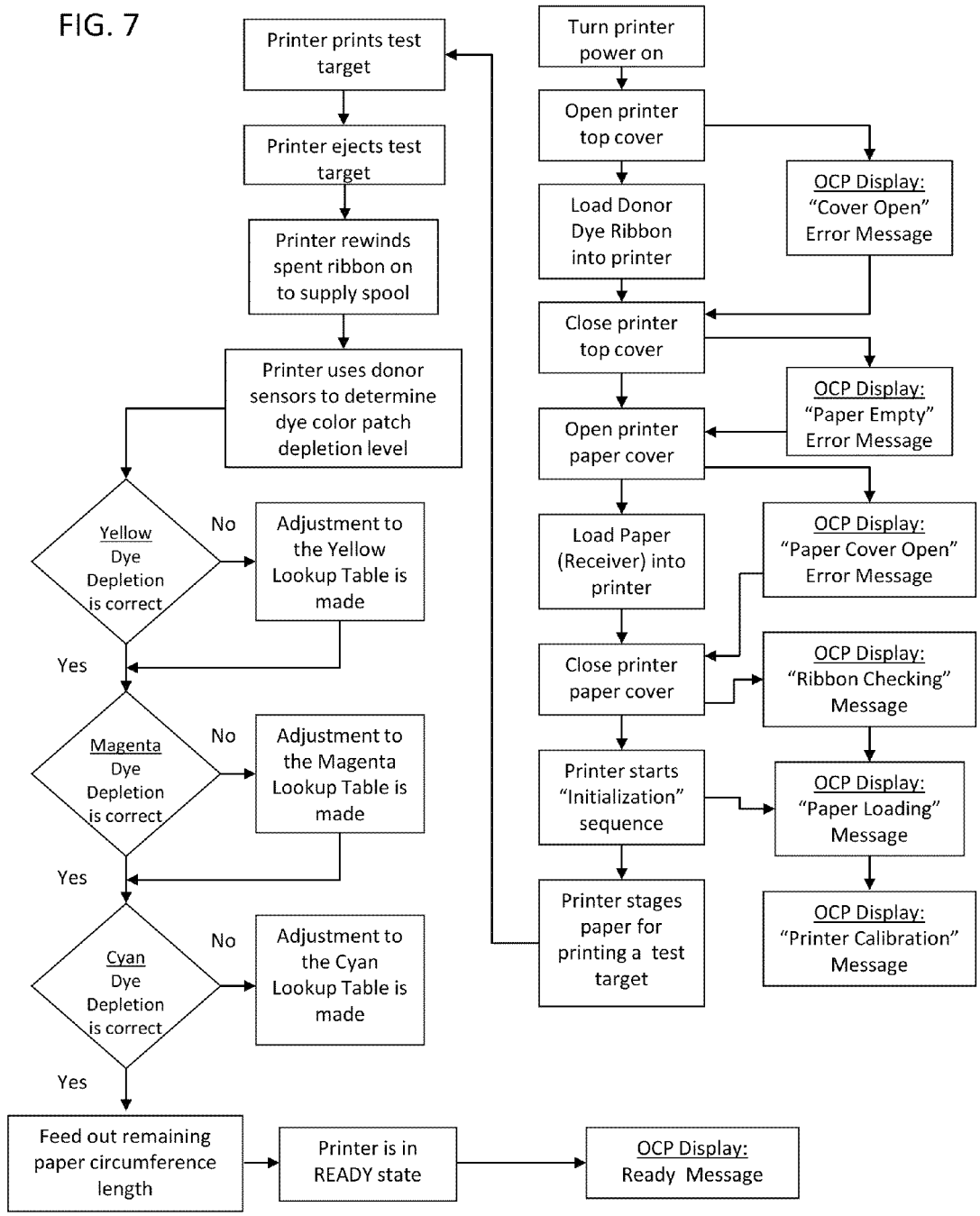
FIG. 7 shows a flowchart for a method for calibrating a thermal printer according to an aspect of the present invention.

FIG. 7 shows a flowchart for a method for calibrating a thermal printer according to an aspect of the present invention. The thermal printer has an Operator Control Panel called an OCP that displays various status messages. The printer power is turned on to activate the OCP display. The donor ribbon 30 and receiver medium 26 are loaded into the thermal printer to stage the receiver medium 26 for printing a test pattern. The OCP displays the corresponding messages based on the status of the printer. The print head can be used to print the test pattern on the receiver medium 26, which can then be ejected from the emitter detector path. The printer can optionally rewind the spent ribbon onto the supply spool. The emitter detector pair can be used to measure a donor depletion level for one or more dye color patches. In a typical thermal printer, a donor ribbon 30 may include yellow, magenta, cyan, and clear donor dye patches. Based on the measured donor depletion levels, adjustments can be made to the lookup tables for the various color dye patches to calibrate the printer for the donor ribbon 30. In other aspects of the present invention, the adjustments can be stored as an adjustment table in processor accessible memory instead of directly changing the lookup tables. The adjustment table can be linked to the lookup table to provide updated energy levels for high efficiency printing.

Figure 8:
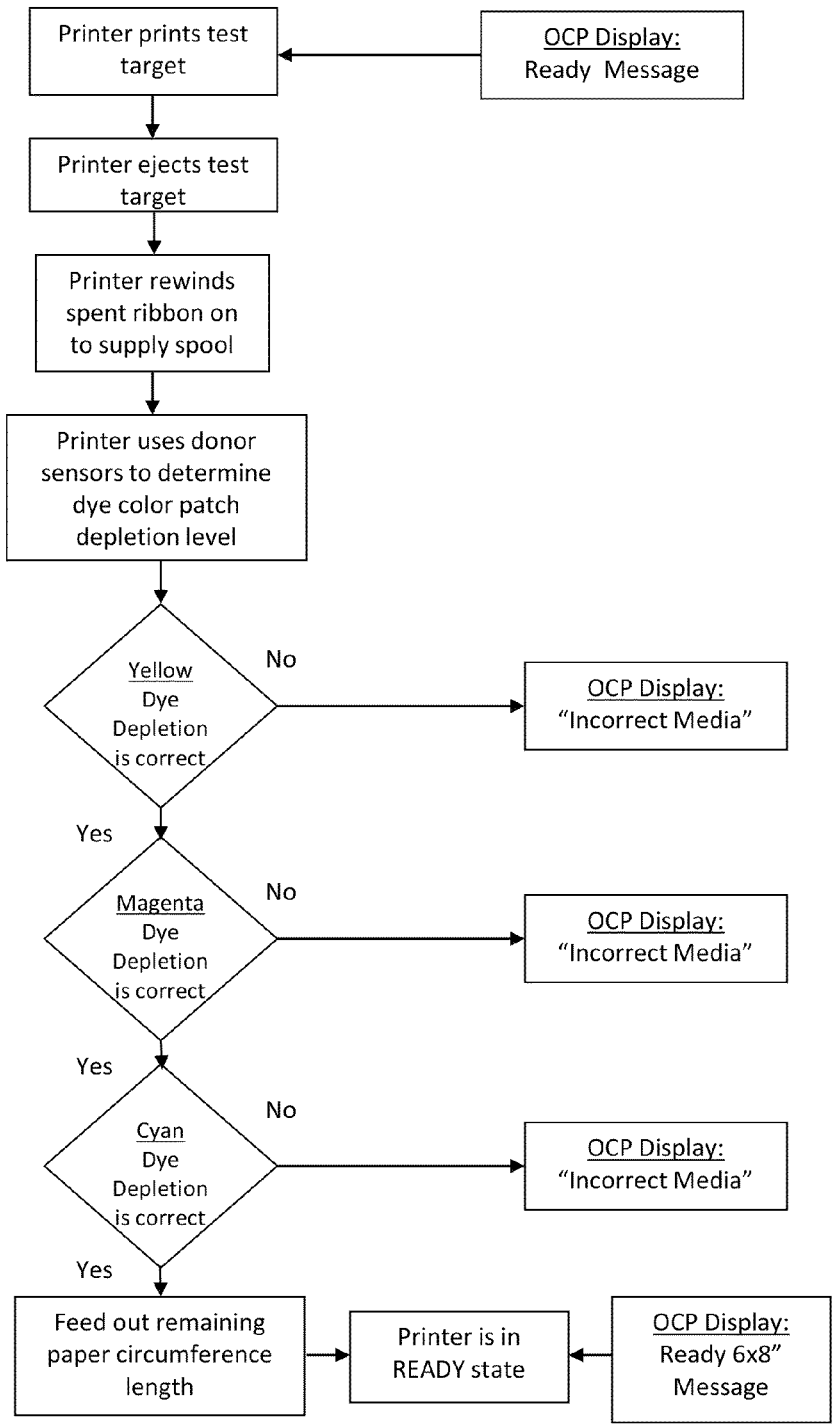
FIG. 8 shows a flowchart for a method for detecting incorrect media in a thermal printer according to an aspect of the present invention.

FIG. 8 shows a flowchart for a method for detecting incorrect media in a thermal printer according to an aspect of the present invention. The thermal printer has an Operator Control Panel called an OCP that displays various status messages. The OCP display shows that the thermal printer is ready for operation. The print head can be used to print the test pattern on the receiver medium, which can then be ejected from the emitter detector path. The printer can optionally rewind the spent ribbon onto the supply spool. The emitter detector pair can be used to measure a donor depletion level for one or more dye color patches and compared with an expected donor depletion level. In a typical thermal printer, a donor ribbon 30 may include yellow, magenta, cyan, and clear donor dye patches. Where high efficiency printing is desired, this method can be used to determine the presence of a non high efficiency donor ribbon 30 in the thermal printer and a warning message can be displayed on the OCP. In this case, the measured donor depletion level is compared to the expected donor depletion level for a high efficiency donor ribbon to determine whether the correct donor ribbon is loaded into the thermal printer. Different threshold amounts, such as upto 5% or upto 10% difference between the expected and measured donor depletion levels can be used for this comparison. The expected donor depletion level for a high efficiency donor ribbon 30 can be measured using the method of FIG. 7 and stored in processor accessible memory for future use.

An aspect of the present invention includes a method and system for calibrating a thermal printer by adjusting a look up table, comprising: providing a donor ribbon having donor material; providing a print head located in the thermal printer, the print head adapted to print images by transferring donor material from the donor ribbon onto a receiver medium; receiving a test pattern to be printed on the receiver medium; printing the test pattern on the receiver medium by heating the print head to heat the donor ribbon causing the donor material to transfer from the donor ribbon onto the receiver medium, thereby depleting donor material on the donor ribbon; using a sensor to measure a depletion amount of the donor material on the donor ribbon after printing; and using a processor to adjust the lookup table based on the measured depletion amount of donor material, thereby calibrating the thermal printer.

The color of the donor material on the donor ribbon can include yellow, magenta, cyan, red, green, blue, gray, black, gold or silver or combinations thereof. The donor ribbon can include a plurality of colored patches of donor material, the color of the patches including magenta, cyan, yellow, red, green, blue, gray, black, gold or silver or combinations thereof.

The test pattern includes at least two portions with different code values, the different code values causing different amounts of donor material to be transferred from the donor ribbon onto the receiver medium, thereby depleting different amounts of donor material on the donor ribbon. The first code value in the test pattern causes the print head to transfer about 0% or about 100% of the donor material onto the receiver medium and a second code value causes the print head to transfer between 5% and 95% of the donor material onto the receiver medium. The difference between the amount of depletion of donor material at the first and second code values can be used to compute an adjustment for the lookup table.

The method and system described above can further include using the sensor to measure an initial amount of donor material on the donor ribbon prior to depletion; and using the processor, when it adjusts the lookup table, to use the difference between the initial amount of donor material and the depletion amount of donor material to compute the adjustment.

The sensor can be an optical sensor comprising an emitter and detector pair, further including emitting light of a particular wavelength from the emitter onto the used donor ribbon, transmitting or reflecting the light from the used donor ribbon onto the detector, and measuring a response of the transmitted or reflected light from the detector. The sensor can be a tri-color sensor with red, green and blue light emitters and corresponding detectors.

Another aspect of the present invention includes a method and system for calibrating a thermal printer by adjusting a plurality of lookup tables, comprising: providing a plurality of donor ribbons having donor material, each donor ribbon being associated with a particular lookup table; and using the method described above for each donor ribbon to adjust its associated lookup table, thereby calibrating the thermal printer.

Another aspect of the present invention includes a method and system for detecting incorrect media in a thermal printer, comprising, providing a donor ribbon having donor material, providing a print head located in the thermal printer, the print head adapted to print images by transferring donor material from the donor ribbon onto a receiver medium, receiving a test pattern to be printed on the receiver medium, printing the test pattern on the receiver medium by heating the print head to heat the donor ribbon causing the donor material to transfer from the donor ribbon onto the receiver medium, thereby depleting donor material on the donor ribbon, using a sensor to measure a depletion amount of the donor material on the donor ribbon after printing, and using a processor to compare the measured depletion amount of donor material with an expected depletion amount of the donor material, thereby detecting incorrect media in the thermal printer when the measured depletion amount of donor material is different from the expected depletion amount by a particular threshold.

The invention is inclusive of combinations of the aspects of the present invention described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The invention has been described in detail with particular reference to certain preferred embodiments thereof, but it will be understood that variations and modifications can be effected within the spirit and scope of the invention.

The invention claimed is:

1. A high efficiency thermal printing system, comprising:
   a donor ribbon having donor material;
   a receiver medium;
   a test pattern to be printed on the receiver medium using the donor ribbon, wherein the test pattern includes at least two portions with different code values, whereby the different code values cause different amounts of donor material to be transferred from the donor ribbon onto the receiver medium;
   a print head located in a thermal printer, wherein the print head is adapted to print the test pattern on the receiver medium by heating the donor ribbon to cause the donor material to transfer from the donor ribbon onto the receiver medium, thereby depleting donor material on the donor ribbon;
   a sensor adapted to measure a depletion amount of the donor material on the donor ribbon after printing the test pattern; and
   a processor adapted to calibrate the thermal printing system by adjusting a lookup table in response to the measured depletion amount of donor material.

2. The thermal printing system of claim 1 wherein the color of the donor material on the donor ribbon includes yellow, magenta, cyan, red, green, blue, gray, black, gold or silver or combinations thereof.

3. The thermal printing system of claim 1 wherein the donor ribbon further includes a plurality of colored patches of donor material, and the color of the patches is chosen from the group consisting of magenta, cyan, yellow, red, green, blue, gray, black, gold or silver or combinations thereof.

4. The thermal printing system of claim 1 wherein the sensor is an optical sensor comprising an emitter and detector pair adapted to emit light of a particular wavelength from the emitter onto the used donor ribbon, to transmit or reflect the light from the used donor ribbon onto the detector, and to measure a response of the transmitted or reflected light from the detector.

5. The thermal printing system of claim 4 wherein the sensor is a tri-color sensor with red, green, and blue light emitters and corresponding detectors.

6. The thermal printing system of claim 1 wherein a first code value associated with a first portion of the test pattern causes the print head to transfer about 0% or about 100% of the donor material onto the receiver medium and a second code value associated with a second portion of the test pattern causes the print head to transfer between 5% and 95% of the donor material onto the receiver medium.

7. The thermal printing system of claim 6 wherein the sensor measures a difference between the amount of depletion of donor material at the first and second code values to compute an adjustment for the lookup table.

8. A high efficiency thermal printing system comprising:
   a donor ribbon having donor material;
   a receiver medium;
   a test pattern to be printed on the receiver medium using the donor ribbon;
   a print head located in a thermal printer, wherein the print head is adapted to print the test pattern on the receiver medium by heating the donor ribbon to cause the donor material to transfer from the donor ribbon onto the receiver medium, thereby depleting donor material on the donor ribbon;
   a sensor adapted to measure a depletion amount of the donor material on the donor ribbon after printing the test pattern; and
   a processor adapted to detect incorrect media in the thermal printer when the measured depletion amount of donor material is different from an expected depletion amount by a particular threshold.

9. The thermal printing system of claim 8 wherein the color of the donor material on the donor ribbon includes yellow, magenta, cyan, red, green, blue, gray, black, gold or silver or combinations thereof.

10. The thermal printing system of claim 8 wherein the donor ribbon further includes a plurality of colored patches of donor material, the color of the patches including magenta, cyan, yellow, red, green, blue, gray, black, gold or silver or combinations thereof.

11. The thermal printing system of claim 8 wherein the test pattern includes at least two portions with different code values, whereby the different code values cause different amounts of donor material to be transferred from the donor ribbon onto the receiver medium.

12. The thermal printing system of claim 11 wherein a first code value associated with a first portion of the test pattern causes the print head to transfer about 0% or about 100% of the donor material onto the receiver medium and a second code value associated with a second portion of the test pattern causes the print head to transfer between 5% and 95% of the donor material onto the receiver medium.

13. The thermal printing system of claim 8 wherein the sensor is an optical sensor comprising an emitter and detector pair, further including emitting light of a particular wavelength from the emitter onto the used donor ribbon, transmitting or reflecting the light from the used donor ribbon onto the detector, and measuring a response of the transmitted or reflected light from the detector.

14. The thermal printing system of claim 13 wherein the sensor is a tricolor sensor with red, green, and blue light emitters and corresponding detectors.

15. The thermal printing system of claim 8 wherein the particular threshold is up to 5% difference between the measured amount of depletion and the expected amount of depletion.

16. The thermal printing system of claim 8 wherein the particular threshold is up to 10% difference between the measured amount of depletion and the expected amount of depletion.

* * * * *